Figure 1:
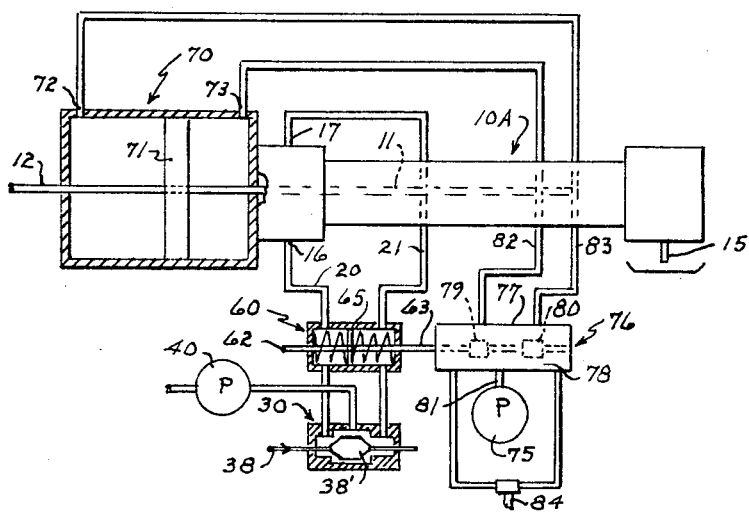

INVENTOR.
FREDERIC LISSAU

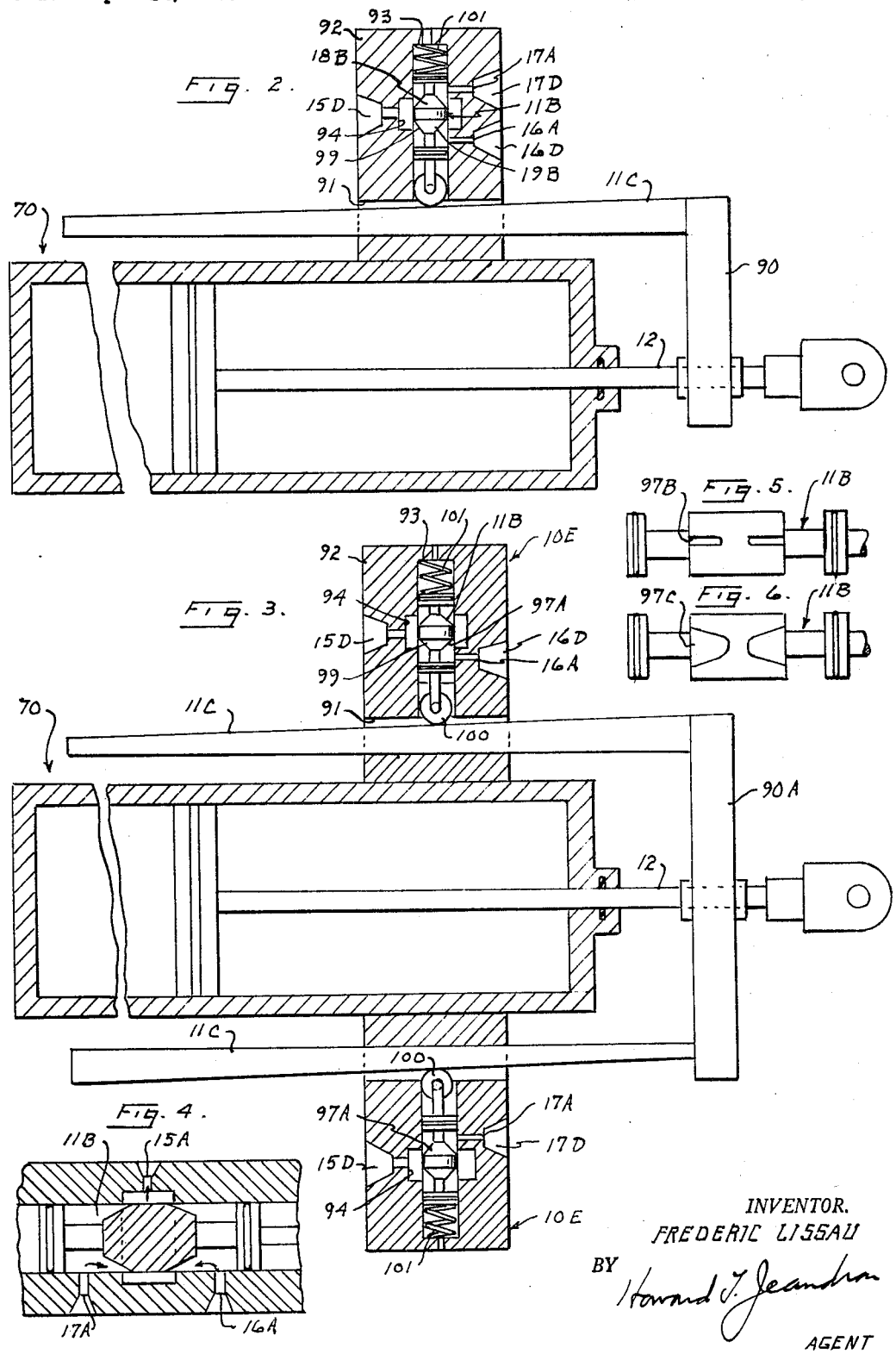

United States Patent Office 3,283,669
Patented Nov. 8, 1966

3,283,669
HYDRAULIC POSITIONING SERVO SYSTEM
Frederic Lissau, 24—15 27th St., Long Island City, N.Y.
Filed Sept. 14, 1965, Ser. No. 487,281
4 Claims. (Cl. 91—388)

This is a continuation in part of my previous application Serial No. 212,069 filed July 24, 1962, now Patent Number 3,215,044, for Hydraulic Positioning Servo System.

The prior application discloses, illustrates and defines a hydristor, a mechanical assembly such as a hydraulic chamber having a metering pin to form two resistances. The metering pin is movable laterally in either direction to change the ratio of these resistances in relation to its position. Thus when the metering pin is moved laterally in either direction to change ratio of resistances in a complementary manner, it will increase one resistance while decreasing the other when moved in one direction and vice versa when moved in the other direction. In the prior application cited the hydristor is a cylinder, reservoir or a valve in which a metering pin is mounted and the cylinder reservoir or metering pin may be of the same length as the power cylinder. In the prior application cited there is an orifice type of flow (mostly turbulent flow). The hydraulic cylinder in which the metering pin is mounted is only cylindrical in form because it contains and coacts with the metering pin and the stroke of the metering pin. Whereas in reality, the cylinder can take any shape as it is simply a reservoir for the return flow of the hydraulic fluid passing through the two variable orifices. The hydristor is in fact a valve which may take other shapes.

It is an object of this invention to provide a hydraulic servo system in which there is provided a hydraulic power cylinder with a piston rod which extends through the cylinder and mounted on one side of the hydraulic cylinder in parallel relationship there is provided a hydristor, said piston rod is in turn connected to a metering pin in said hydristor by a mechanical yoke having a cam that bears upon said metering pin, and in which a fluid supply is connected through a ratio flow divider and the ratio flow divider in turn to a sensing null unit and in turn to two variable orifices in said hydristor, and in which said cam is parallel to said piston rod so that the position of the metering pin is a function of the displacement of the piston in the power cylinder, and a second fluid supply is connected through an amplifier valve to opposite ends of said power cylinder, and said amplifier valve controlled in its movement by the sensing element of the null unit.

It is a further object of this invention to provide a hydraulic servo system in which there is provided a hydraulic power cylinder with a piston rod which extends through the cylinder and mounted on either side of the hydraulic cylinder in parallel relation there are provided a pair of valves which taken together is the hydristor, said piston rod is in turn connected to each metering pin of each valve of said hydristor by a mechanical yoke having a pair of cams that bear upon said metering pins, and in which a fluid supply is connected through a ratio flow divider and the ratio flow divider in turn to a sensing null unit and in turn to two variable orifices in said hydristor, and in which said cams of said yoke are parallel to said piston rod so that the position of the cams are a function of the displacement of the piston in the power cylinder, and a second fluid supply is connected through an amlpifier valve to opposite ends of said power cylinder, and said amplifier valve controlled in its movement by the sensing element of the null unit.

Other objects of this invention shall be apparent by reference to the accompanying detailed description and the drawings in which FIG. 1 is a schematic of a load compensated power system, FIG. 2 is a cross sectional view of a valve hydristor mechanically connected to a power cylinder, FIG. 3 is a still further embodiment similar to FIG. 2 in which the hydristor is divided into two components, FIG. 4 is a further modification of the metering pin shown in FIG. 2, FIG. 5 illustrates the metering pin of FIG. 4 with tapered slots, and FIG. 6 illustrates the metering pin with tapered flats.

Referring to the drawings and particularly FIG. 1 there is illustrated a hydraulic cylinder 10A in which there is mounted a metering pin or element 11 and also within the cylinder there is provided an outlet port 15 at one end and a pair of inlet orifices 16 and 17 at the opposite end of said cylinder. The metering pin is connected to a piston rod 12 that extends beyond said hydraulic cylinder passing through a rod seal or aperture 14 at one end of said cylinder.

In FIG. 1 it is to be noted that the metering pin 11 may be formed into two surfaces each one slanted, it is also to be noted that one end of cylinder 10A is joined to an enlarged power cylinder 70, the power cylinder 70 being provided with a piston 71 and two ports 72 and 73 at either end of said cylinder. It is also to be noted that the piston rod 12 of cylinder 70 extends through the power cylinder and is affixed to the piston 71. The piston rod 12 is also connected to the metering pin 11 of the hydristor. The power cylinder 70 is also connected by means of its ports 72 and 73 to a power hydraulic pump 75, that is, hydraulic fluid under high pressure and proper volume is suppied by this pump 75 through an amplifier valve 76. Valve 76 is a four ported valve with a closed cylindrical bore 77 and a valve casing 78. Valve casing 78 retains two pistons 79 and 80 fitted to the cylindrical bore but connected by a central core of less diameter. The fluid from said pump 75 passes through an inlet 81 at the center of said valve to surround the lesser diameter of the piston. With the piston of valve casing 78 in its central position, the outlet ports 82 and 83 are closed. Valve casing 78 is also connected by the rod 63 extending through the body and attached to rod 62 of the null unit 60. Thus, with movement of piston 65 of the null unit 60, the double piston of valve casing 78 of vale 76 may be moved in either direction, for example, if moved to the left, it will open port 82 to permit a flow of fluid from pump 75 through valve 76, through port 82, to inlet port 73 of the power cylinder. The opposite side of the power cylinder will expel fluid through port 72, through the opposite line to the opposite port 83 of vale 76, which is in turn connected to return port 84. Similarly, if the double piston of valve casing 78 had been moved in the opposite direction, fluid would be expelled through the return port 82.

In FIG. 1 there is illustrated a schematic of a servo system utilizing the linear type hydristor 10A as a feedback element. This is comprised of the cylinder 10A with the metering pin 11 therein, also a power cylinder 70 with a piston rod 12. Connected to its orifices 16 and 17 is a ratio flow divider 30 and the ratio flow divider in turn being connected to a pump 40. The ratio flow divider 30 is provided with an acuator signal input rod 38 which is connected to the central dividing element or valve 38' of the ratio flow divider 30. This becomes the control element for the complete system. However in this instance the two fluid lines connecting orifices 16 and 17 to the flow divider 30 are provided with a null unit 60. The null unit is in the form of a single enclosed cylinder with a spring centered piston 65, the intercepted lines 20 and 21 passing into either end of the cylinder 60 and out of cylinder 60 at either end to the flow divider 30. The single piston 65 is positioned in the center of cylinder 60 to maintain the divided fluid flow through both ends of the cylinder but respond to any unbalance of pressure in either end.

Piston 65 is also provided with a pair of piston rods 62 and 63 which extend through and out of either end of cylinder 60. It is apparent that piston 65 becomes a sensing element that is moved in either direction depending upon the pressures on either side of said piston and such movement is reproduced by the piston rods 62 and 63. The hydristor 10A, referred to in FIG. 1, being a coined word may be defined as a mechanical assembly such as a hydraulic cylinder or a valve with a metering pin mounted therein to form two complementary resistances, two fluid inlet orifices at one end of the cylinder and a fluid return port. The metering pin is fitted within the cylinder with a taper to allow a flow from the orifices to flow past the metering pin. The metering pin member is displaced as a function of output position either direct or through intermediate mechanical means, there are two complementary resistances created, R1 and R2; their $R1/R2$ is therefore a function of output position. Each of the resistances is connected in series, that is, through the legs or pipes to opposite ends of the ratio flow divider 30 with similar resistances $r1$ and $r2$, which are created in the same order in the ratio flow divider as a function of input postion, so that the pressure $p1$ and $p2$ in the legs or pipe connections 16D and 17D (FIG. 2) equal each other if $$\frac{R1}{R2}=\frac{r1}{r2}$$

Thus, it is the purpose of the hydristor to utilize the pressure differential $p1$ and $p2$ as a remote input signal or error signal. Since the pressures $p1$ and $p2$ are created by the input setting or $d1/r2$, it would be equally correct to state that the ratio $r1/r2$ is used as the input signal, and the pressure differential between $p1$ and $p2$ as the error signal. When the pressure drop across the orifices in flow dividers 30 (FIG. 1) as well as across each of the orifices 16A and 17A and their coacting surfaces 18B and 19B (FIG. 2) are equal, the servo valve 76 will be in equilibrium. It is apparent that as the pressure drop across one orifice of the flow divider as well as one orifice of the hydristor increases, the pressure drop across the other orifice of the flow divider and the other orifice of the hydristor decreases and the servo valve is displayed to meter the fluid to the cylinder 70 and the piston 71 is moved to a new position.

It is to be noted that with the non-position seeking type of hydristor, the metering pin is fitted within a bore 93 which contains two apertures that are the orifices 16A and 17A. The two apertures mating with the metering pin provide the two complementary resistances to the fluid flow. The metering pin 11 is provided with two tapered surfaces 18B and 19B that coact with the two apertures 16A and 17A (FIG. 2) to control the ratio of the complementary flows. The orifice flow produces a leakage or seepage of the fluid through the opening created by the tapered surfaces in the metering pin which is in reality the means of producing the ratio of the flow from the two orifices. The fluid that is normally fed in through lines 20 and 21 (FIG. 1) to the orifices 16 and 17 will flow from each orifice 16A and 17A (FIG. 2) over the coacting surfaces toward the outlet port 15D providing complementary hydraulic resistances whose ratio is a function of the displacement of the moving member (metering pin 11). The hydristor does not provide any effective pressure areas. A hydraulic resistance could be defined as follows:

R _____ Hydraulic resistance.
P _____ Pressure differential.
Q _____ Flow in gallons per minute.

$d$=diameter of orifice. $A$=urea of orifice.

(1) $$R=\frac{\sqrt{\Delta P}}{Q} \text{ definition}$$

Flow thru an orifice is (2) $$Q-K_1 d^2 \sqrt{\Delta P}$$

Whereby $K_1$ is a constant containing specific gravity and orifice coefficient.

Referring to FIG. 2 there is illustrated a power cylinder 70, the power cylinder is provided with a piston rod 12 which extends through the cylinder 70. Mounted on one side of the power cylinder 70 there is a hydristor 10D. A mechanical yoke 90 is affixed to the end of the piston rod 12 and affixed to a tapered cam 11C which is retained in a parallel relationship with the piston rod 12 and the tapered cam 11C extends through an aperture 91 in the hydristor 10D. The hydristor 10D is illustrated in another modification in this embodiment in fact it resembles a double faced poppet valve providing a pair of opposed conical surfaces. The hydristor 10D is comprised of a casing 92 having a central bore 93, the central bore 93 is provided with an enlarged central bore 94. Mounted within the bore 93 is a metering pin 11B. The metering pin 11B at its center is provided with two tapered, slanted, or conical surfaces 18B and 19B. The opposed conical surfaces are positioned within the enlarged bore 94 to move toward or away from the poppet valve seats 98 or 99 according to the movement of metering pin 11B, that is, if the metering pin is moved upward, FIG. 2, the resistance to the flow through orifice 17A increases while the resistance to the flow of orifice 16A decreases whereas if the metering pin 11B moves downward, the resistance to the flow through orifice 17A decreases while the resistance to the flow of orifice 16A increases. The opposed conical surfaces are used to control the flow of fluid through orifices 16A and 17A, orifice 16A being connected to port 16D while orifice 17A is connected to port 17D. The enlarged bore 94 is in turn connected to a return port 15D. The movement of the opposed conical surfaces are utilized to vary the resistance to the flow of the orifices. The manner in which the opposed conical surfaces are moved is dependent upon the tapered cam 11C, that is, at the end of meteriing pin 11B there is a roller 100 resting upon the surface of the tapered cam while the opposite end of metering pin 11B is provided with a resilient element or spring 101, thus spring 101 retains the metering pin 11B in its rolling contact with the tapered cam 11C. As cam 11C is moved to the right, FIG. 2, metering pin 11B will drop downward increasing the resistance at orifice 16A and decreasing the resistance at orifice 17A and of course if cam 11C is moved in the opposite direction, left, FIG. 2, metering pin 11B is moved upward and this will increase resistance at orifice 17A and decreases resistance at orifice 16A. Thus the tapered cam 11C will be positioned by the power cylinder and will move in either direction depending up on the unbalance created by the flow divider and null unit (FIG. 1). However it is to be noted that when the metering pin is in a central balanced position, the turbulent flow from orifices 16A and 17A to the return port will be equal but with the movement of the metering pin 11B upward, the flow through orifice 16A onto 19B increases while the flow through orifice 17A onto 18B decreases due to the taper of the cam in the metering pin. And vice versa if the metering pin is moved in the opposite direction, the flow through orifice 16A to 19B decreases while the flow through orifice 17A to 18B increases. This cylinder 10D as described shall be referred to hereinafter as the hydristor.

Referring to FIG. 3 there is illustrated a further embodiment of this invention showing a power cylinder 70 similar to that illustrated in the prior embodiments and the power cylinder is provided with a piston rod 12 which extends through the cylinder 70. Mounted on opposite sides of the power cylinder 70 there are a pair of valves which together may be referred to as the hydristors 10E. A mechanical yoke 90A is affixed at its opposite ends to a pair of oppositely tapered cams 11C which are retained in a parallel relationship to the piston rod 12 and each tapered cam or metering pin 11C extends through an aperture 91 of its related hydristors 10E. The hydristors 10E are illustrated in another modification in this embodiment similar to the embodiment of FIG. 2 in fact each hydristor resembles a poppet valve. Each hydristor 10E is comprised of a casing 92 having a central bore 93, the central bore 93 is provided with an enlarged central bore 94. Mounted within the bore 93 is a metering pin 11B. The metering pin 11B at its center is provided with a conical surface 97A. The conical surface 97A is positioned within the enlarged bore 94 to move toward or away from the valve seat 99 according to the movement of metering pin 11B, that is if the conical surface is moved toward the valve seat 99, the resistance to the orifice flow increases while if the conical surface is moved away from the valve seat 99 the resistance to the orifice flow decreases. The one hydristor is used to control the flow of fluid through orifice 16A while the other hydristor is used to control the flow of fluid through orifice 17A, orifice 16A being connected to port 16D while orifice 17A is connected to port 17D. The enlarged bores 94 are in turn connected to the return port 15D. The movement of the opposed poppet valves in the opposed hydristors is utilized to vary the resistance to the flow of the orifices. The manner in which the opposed poppet valves are moved is dependent upon the tapered cams 11C, that is, at the end of metering pin 11B in each case there is a roller 100 resting upon the surface of each tapered cam while the opposite end of metering pin 11B is provided with a resilient element or spring 101, thus spring 101 retains metering pin 11B in its rolling contact with the tapered cam 11C. As the cams 11C are moved to the right, FIG. 3, metering pin 11B of the upper hydristor 10E will drop downward, while metering pin 11B of the lower hydristor 10E will also moved downward. Thus the resistance at orifice 16A will be increased while the resistance at orifice 17A will be decreased and of course if cam 11C is moved in the opposite direction left, (FIG. 3) metering pin 11B of the upper hydristor is moved upward and metering pin 11B of the lower hydristor is also moved upward and this will decrease resistance at orifice 16A and increase resistance at orifice 17A. Thus this embodiment of the hydristor functions in a similar manner to the hydristors described in the prior embodiments.

Referring to FIGS. 4, 5 and 6 there is illustrated a further embodiment of the metering pin 11B illustrated in FIG. 2. In this embodiment instead of providing opposed conical surfaces there are provided a pair of opposed slots 97B as shown in FIG. 5 or opposed slanted flats 97C as shown in FIG. 6. Otherwise, the metering pin 11B operates similarly to that described in FIG. 2 except in the modification shown in FIGS. 4, 5 and 6, the metering pin 11B must be positioned so that the slots 97B or the flats 97C positioned in opposed relationship as shown in FIG. 4 are retained in alignment with the orifices 16A and 17A.

Although applicant has described the hydraulic interactions which occur when an input signal is applied to the signal input valve, we must, however, also consider what occurs when a load is applied to the power cylinder. In this instance, the hydristor acts as the signal input valve. The hydristor upon being displaced an increment by the applied load unbalances the central circuit such that the pressure difference between P1 and P2 causes the null unit to move the servo valve to deliver fluid from pump 75 (FIG. 1) to compensate the power cylinder against displacements caused by any externally applied load.

This fact establishes the inter-relation between signal input valve 30 and hydristor 10A.

Although applicant is primarily interested in a hydraulic servo system similar to that illustrated in the prior applications, this continuation is to modify the servo system utilizing a different form of hydristor without departing from the spirit of this invention and this invention shall be limited only by the appended claims.

What is claimed is:

1. A hydraulically positioned servo system which includes a power cylinder and a hydristor as a position feed back element and input valve, said power cylinder provided with a piston, said hydristor comprising a valve that is provided with a metering element mounted therein, said metering element provided with two opposed surfaces to divide said valve into two movable oppositely slanted surfaces, said metering element movable in either direction to change the ratio produced by said oppositely slanted surfaces in relation to its position, said valve provided with two inlet ports, said inlet ports connected to orifices that are directed toward said opposed slanted surfaces of said valve, an outlet port open to both orifices, said opposed slanted surfaces movable toward or away from said orifices to produce two complementary fluid flows, said hydristor provided with a metering cam fitted to said piston of said power cylinder and parallel thereto, said metering cam provided with a slanted surface to bear against the end of said metering element of said hydristor, said metering element resiliently retained in contact with said metering cam, said servo system divided into a power stage and a feed back control stage, said power stage comprising said power cylinder and piston, a main pressure source and a four way valve, said four way valve connected by fluid lines to said power cylinder, said feed back control stage comprising said hydristor, an auxiliary pressure source, a ratio flow divider serving as a signal input valve to provide two complementary fluid flows and two complementary resistances, a differential pressure sensing device which is mechanically connected to said four way valve and connected by fluid lines to said ratio flow divider and to said hydristor, said four way valve connected to said main pressure source and comprising a valve body with a central axially movable piston having fluid flow controlling lands thereon to separate and guide said fluid flow to either side of said power cylinder, said hydristor having its metering element mechanically connected to the moving piston of said power cylinder as a feedback element, said ratio flow divider comprising a closed casing with a fluid inlet port at its center and two fluid outlet ports one at each end of said casing, a piston and rod mounted loosely and centrally within said closed casing to produce two complementary fluid flows similar to the two complementary flows produced in said hydristor, said rod providing the means for a mechanically produced input signal, said piston rod extending through said cylinder, said piston providing a metering effect to generate said two complementary hydraulic resistances and to effect said two complementary flows, said differential pressure sensing device comprising a closed cylinder with two fluid inlet ports and two fluid outlet ports and a piston, one inlet and one outlet port connected to each end of said closed cylinder to allow a fluid flow therethrough, and a resilient element positioned on each side of said piston to normally retain said piston centered when said fluid pressure on each side of said piston is equal, said piston of said differential pressure sensing device connected to said piston of said four way valve to control its pressure and in turn control the fluid flow to said power cylinder, said differential pressure sensing device which includes said resilient element also responding to pressure changes to move said four way valve to correct an error signal when a pressure differential exists in said differential sensing device by moving said four way valve in the direction indicated by the error signal and in turn move said piston of said power cylinder and said metering element of said hydristor to reduce said error signal to zero.

2. A hydraulically positioned servo system which includes a pair of opposed hydristors as a position feed back element and input valve, each hydristor comprising a valve that is provided with a metering element mounted therein, said metering element provided with a surface that is movable in either direction to change the ratio of said fluid flows of said opposed hydristors in relation to its position, each valve provided with an inlet port, each inlet port connected to an orifice that is directed toward a valve surface, an outlet port in each valve open to said orifice, said metering elements of said opposed valves movable toward or away from said orifices to produce two complementary fluid flows, a pair of metering cams each one fitted within their respective valves and provided with oppositely slanted surfaces to bear against the end of each metering element, each metering element resiliently retained in contact with its respective metering cam, said pair of cams movable in unison, in either direction, said servo system divided into a power stage and a feed back control stage, said power stage comprising a power cylinder and piston, a main pressure source and a four way valve, said four way valve connected by fluid lines to said power cylinder, said feed back control stage comprising said hydristor, an auxiliary pressure source, a ratio flow divider serving as a signal input valve to provide two complementary fluid flows and two complementary resistances, a differential pressure sensing device which is mechanically connected to said four way valve and connected by fluid lines to said ratio flow divider and to said hydristor, said four way valve connected to said main pressure source and comprising a valve body with a central axially movable piston having fluid flow controlling lands thereon to separate and guide said fluid flow to either side of said power cylinder, said hydristors having their metering elements mechanically connected to the moving piston of said power cylinder as a feed back element, said ratio flow divider comprising a closed casing with a fluid inlet port at its center and two fluid outlet ports one at each end of said casing, a piston and rod mounted loosely and centrally within said closed casing to produce two complementary fluid flows similar to the two complementary flows produced in said hydristor, said rod providing the means for a mechanically produced input signal, said piston rod extending through said cylinder, said piston providing a metering effect to generate said two complementary hydraulic resistances and to effect said two complementary flows, said differential pressure sensing device comprising a closed cylinder with two fluid inlet ports and two fluid outlet ports and a piston, one inlet and one outlet port connected to each end of said closed cylinder to allow a fluid flow therethrough, and a resilient element positioned on each side of said piston to normally retain said piston centered when said fluid pressure on each side of said piston is equal, said piston of said differential pressure sensing device connected to said piston of said four way valve to control its pressure and in turn control the fluid flow to said power cylinder, said differential pressure sensing device which includes said resilient element also responding to pressure changes to move said four way valve to correct an error signal when a pressure differential exists in said differential sensing device by moving said four way valve in the direction indicated by the error signal and in turn move said piston of said power cylinder and said metering element of said hydristor to reduce said error signal to zero.

3. In a device according to claim 2 in which the metering element of the hydristor are in opposed relation either side of said power cylinder and mechanically connected to the piston rod of the power cylinder so that the position of the metering element and the resulting ratio of said complementary hydraulic resistances are being scheduled and registered by the position of the piston rod of said power cylinder.

4. In a device according to claim 2 in which the servo system responds when a load is applied to the power cylinder so that the hydristors react as signal input valves and the null unit and servo valve react as a positive reference.

References Cited by the Examiner

UNITED STATES PATENTS

| 2,394,384 | 2/1946 | Horstmann | 91—391 |
| 2,499,496 | 3/1950 | Grimes et al. | 137—625.4 |
| 2,802,484 | 8/1957 | Sheets | 137—625.4 |
| 2,989,950 | 6/1961 | Lockman | 91—388 |
| 3,215,044 | 11/1965 | Lissau | 91—388 |

FOREIGN PATENTS

| 141,939 | 7/1951 | Australia. |
| 423,676 | 1/1926 | Germany. |
| 901,761 | 7/1962 | Great Britain. |

MARTIN P. SCHWADRON, *Primary Examiner.*

PAUL E. MASLOUSKY, *Examiner.*